(12) United States Patent
Johansson et al.

(10) Patent No.: US 6,873,624 B1
(45) Date of Patent: Mar. 29, 2005

(54) ARRANGEMENT AND A METHOD IN A SWITCHED TELECOMMUNICATION SYSTEM

(75) Inventors: Mathias Johansson, Stockholm (SE); Lars Adolfsson, Stockholm (SE); Per Bäckström, Hägersten (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/572,691

(22) Filed: May 16, 2000

(30) Foreign Application Priority Data

Jun. 16, 1999 (SE) ............................................. 9902266

(51) Int. Cl.[7] .............................. H04J 3/22; H04J 3/26; H04L 12/28; H04L 12/56
(52) U.S. Cl. .................. 370/465; 370/395.43; 370/390; 370/400; 370/432
(58) Field of Search ................................ 370/465, 432, 370/400, 389–390, 395.3, 395.53, 395.54, 353, 331, 352, 392, 411, 419, 422, 425, 437, 460

(56) References Cited

U.S. PATENT DOCUMENTS

| | | | |
|---|---|---|---|
| 5,416,781 A | * 5/1995 | Ruiz | ........................... 370/524 |
| 5,684,800 A | 11/1997 | Dobbins et al. | |
| 5,812,533 A | 9/1998 | Cox et al. | |
| 5,959,989 A | * 9/1999 | Gleeson et al. | ............. 370/390 |
| 5,978,951 A | * 11/1999 | Lawler et al. | ............... 714/758 |
| 6,487,657 B1 | * 11/2002 | Brockmann | .................. 713/154 |
| 6,502,135 B1 | * 12/2002 | Munger et al. | ............. 709/225 |

FOREIGN PATENT DOCUMENTS

| | | |
|---|---|---|
| EP | 0812086 A2 | 6/1997 |
| WO | 95/01023 | 1/1995 |

OTHER PUBLICATIONS

Thayumanavan Sridhar: "Layer 2 and layer 3 Switch Evolution", The Internet Protocol Journal, vol. 1, No. 2, Sep. 1998, Cisco.

* cited by examiner

*Primary Examiner*—Chi Pham
*Assistant Examiner*—Ronald Abelson

(57) ABSTRACT

The present invention relates to a telecommunication system enabling a user to select services. A telecommunication system having a switched domain comprising switches is disclosed. Service networks are connected to the switches and users are also connected to the switches using fines. An IP path selector and an operator are also connected to the switches. The operator forms service network groups by selecting among the service networks. The service network groups are allocated a virtual local network each by configuring the ports in the switches and the IP path selector. The users can select services by means of selecting one or several of the virtual local networks. By configuring their devices to their chosen virtual local network the user receives the services desired. The user can also change his selection of services by reconfiguring and thus connect to an alternative virtual local network.

14 Claims, 6 Drawing Sheets

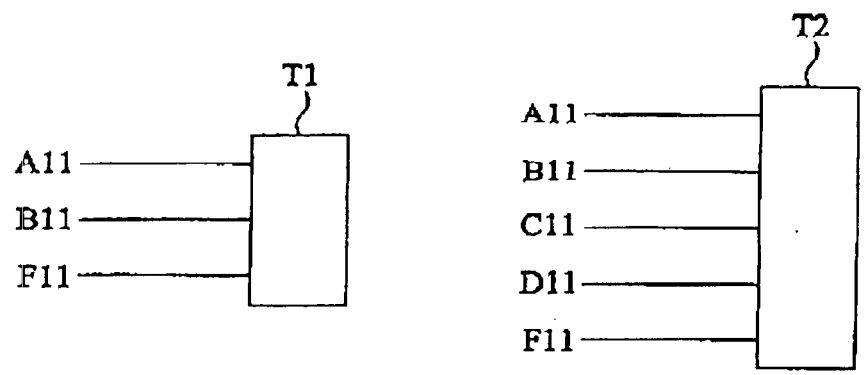
Fig. 3
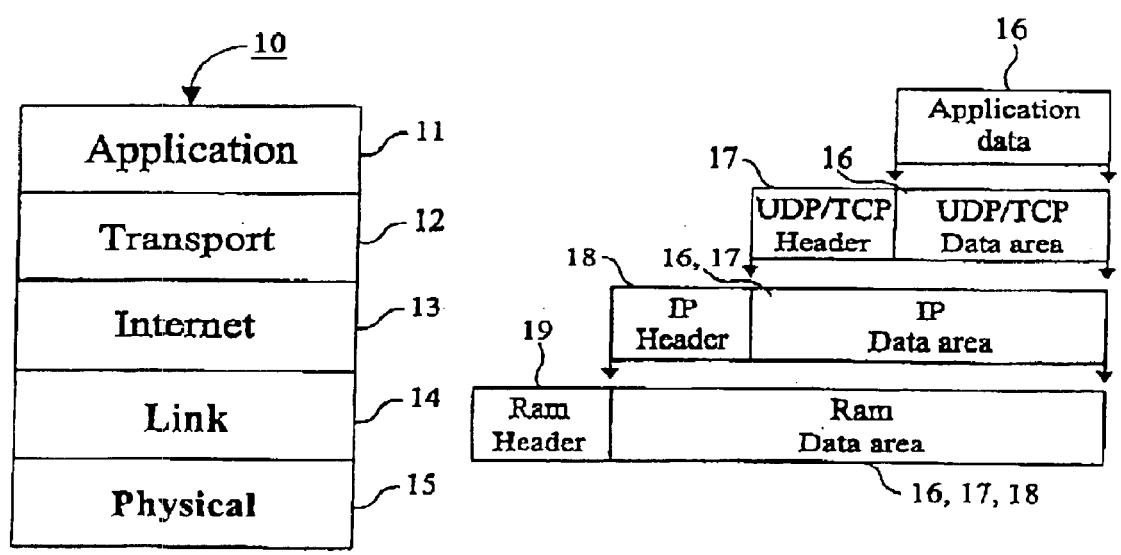
Fig. 4
Fig. 5

ARRANGEMENT AND A METHOD IN A SWITCHED TELECOMMUNICATION SYSTEM

TECHNICAL FIELD

The present invention relates to a device and a method in telecommunication having the option for an end user to select services.

BACKGROUND ART

The rapid development in data and telecommunication creates a constant flow of new possibilities to serve a number of new needs and to meet new demands. The time when each network offered one single standard service is gone. It is now possible to offer a plurality of services having different characteristics in the same network in order to serve individual, specific needs. An individual house hold will be able to select their own set of services according to their own demands among a multitude of possibilities. Housing companies can rationalise administration and maintenance of their buildings and at the same time offer new types of services to their tenants. Other companies and also communities can benefit from the offered possibilities.

One of the techniques which then is used is virtual local networks, or techniques within the wider area virtual broadcast domains. The term virtual local networks is some time given the acronym VLAN (Virtual Local Area Network). The acronym it self VLAN is a market term which is used by almost every switch manufacturer, but it lacks a detailed definition. This results in that different manufacturers can use the same term without their equipment being compatible. A definition which is broad enough to cover different manufacturers equipment is as follows. VLAN: A logic level two (link level) broadcast domain. The selection from the total broadcast domain, i.e. all ports and MAC addresses (Medium Access Control), can be made in any of the following ways. a) Select the group of ports, b) Select a group of MAC addresses or c) Select a group of protocols, for example IP or IPX.

The standard IEEE 802.1Q which has been adapted as industrial standard for VLAN, is based on standard LAN switches according to IEEE 802.2 standards. Switches which implement the standard IEEE 802.1Q are in principle switches compatible with the standard IEEE 802.1D (LAN switches), which have modifications for rules relating to incoming and transmitted data packets, an additional protocol for identifying VLAN capability of other switches and connected end systems and in addition having a VLAN transport mechanism based on implementation of VLAN marking of data packets via specific identification bits in the data packets.

The standard IEEE 802.1D describes how a so called LAN-switch should operate. A LAN-switch is to communicate user data in layer two in the OSI model, based on MAC addressing. Within this standard there are rules relating to transmission logic and how ports shall act in order to comply with for example requirements on transparent bridging, i.e. that the transmission logic remains invisible for apparatuses connected to the domain. Within the standard there are also topology rules in order to avoid loops.

In order to offer Ethernet traffic priority there is the standard IEEE 802.1D. This is an addition to the standard IEEE 802.1D. Ethernet communication is performed using data packets, to which a packet having an address is added. The communication is also divided into different levels, where each level has its own address packets.

The technique for virtual local networks is used to reduce costs associated with addition, moving or change of end user equipment within, for example, companies. The personnel within a part of the company, for example the purchasing department, shares the same resources in the network. By means of associating all users and resources to a VLAN it is possible to add new or remove old equipments, move personnel between floors and change their department belonging without moving cables or change access filters in IP-path selectors.

In the American Patent U.S. Pat. No. 5,751,967 a system for configuring virtual local networks is described. The system sets the switches of the network in a desired manner so that connected end stations are connected in a desired topology and the system can reconfigure the switches when the end stations move. The system has a central device for carrying out these tasks. This device comprises a circuit for sensing modifications of the topology. The central device also has a circuit containing rules how the switches are to be reconfigured when end stations are moved and a circuit for reading the rules and determining how end stations and switch ports are to be grouped. Finally, in the central device a circuit is incorporated which carries out the automatically decided reconfiguration. The system is efficient but has the drawback that it is completely automatically controlled by the central device and can not in any way easily be operated by the users.

The International Patent Application WO98/44684 describes a technique for creating virtual broadcast domains, which are virtual networks within a larger physical network. Also, a log in method is described according to which a terminal being switched on is associated with a first virtual broadcast domain. When the user later logs on he is switched to the virtual broadcast domain to which he belongs. A part of the stations in the larger network are connected to this virtual broadcast domain. A message from one of these stations only reaches the stations connected to the domain. The log in method has the advantage that it is possible to log on from an arbitrary terminal, but it also brings about administrative costs.

SUMMARY OF THE INVENTION

The present invention addresses the problem how an end user in a telecommunication system selects desired services from a number of offered services, which are delivered via a service network from service providers.

Another problem is related to secrecy, and rather how the different services are to be kept secret for unauthorised service providers.

The problem is solved by means of forming the service networks into service network groups having a desired content of services. The service network groups are given different virtual broadcast domains, which carry the information from their service network group. The end users can then select services by means of selecting one or several of the virtual broadcast domains.

In more detail, the problem is solved so that different service networks, for example telephony networks, Internet, cable television networks, networks for alarm etc. are connected to a switched domain, possibly via a router. By means of a selection among the service networks these are formed into service network groups in a desired way. Each service network group is given at least one virtual broadcast domain by means of configuring ports in the switches in the switched domain. The end users can then select service network group by means of selecting one or several of the virtual broadcast domains. The switched domain has one device connection, to which the end user can connect required end devices and connect his selected virtual broadcast domain by means of configuration of switch ports. When the end user wants a changed service, he can select another virtual broadcast domain which carries services from the now wanted service networks. A change to the new domain is performed by means of reconfiguration of ports in the switches and reconfiguration at the end user. The service networks are separated from each other also at the virtual broadcast domains by means of excluding a certain type of coupling element, so called hubs, from the switched domain. There is full secrecy between the service providers, so that no provider can access traffic on another service network.

An object of the present invention is thus to offer the users access to services present at different service networks. The end user is to be able to select service level and shall in a simple way be able to change his service level.

Another object is that different service providers shall be blocked from accessing information on each others networks.

An advantage of the invention is that the users in a simple way can access a desired service from the service networks. A: change of service level requires no expensive re-settings of servers in the networks.

Another advantage is that the network operator, often the owner of the local network, is relieved of having to keep track of the service providers and to which providers the users are connected. The network operator can if desired leave to the users themselves to reset their connection to the broadcast domains when the users desire a changed service.

Another advantage is that it is easy to add the new service by means of forming new service network groups.

Yet another advantage is that unauthorised eavesdropping between service providers is made more difficult.

In the present invention the term telecommunication system is used, which is intended to cover a very broad technical field and comprises for example telephony, data, video and telemetric systems.

The invention will now be described in more detail using preferred embodiments and with reference to the accompanying drawings.

DESCRIPTION OF THE FIGURES

FIG. 3 shows block diagrams of service network groups;

FIG. 4 shows a block diagram of a communication structure having different layers;

FIG. 5 shows block diagrams with data sequences for the layers;

DESCRIPTION OF PREFERRED EMBODIMENTS

Figure 1:
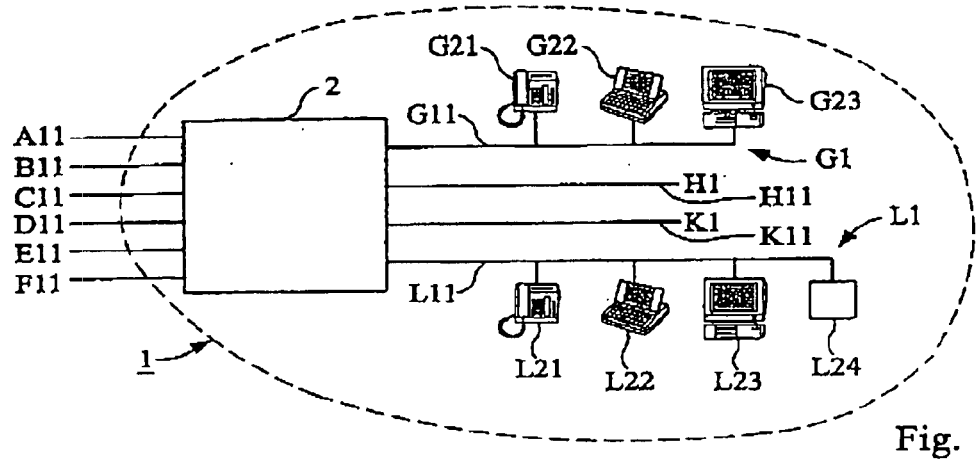
FIG. 1 shows a simplified block diagram of the network.

A fairly large number of different telecommunication and data services are available at different service networks and different users have the option to select some desired services and subscribe to these. The user can for example be a private person or belong to some type of group. In FIG. 1 this is illustrated very schematically with a tenant-owners' society 1 having a distribution network 2 for telecommunication and data services. To the distribution network 2 an outside service network A11 for telephony, an external cable television network B11, Internet C11 and a service network D11 carrying alarm services are connected. To each service network there is an external service provider which however is not shown in the figure. Within the society 1 there are internal service networks, an internal supervision network E11 and an internal, interactive cable television network F11. Different users G1, H1, K1 and L1 in the society shall have the option to select which services they want to use. For example the user G1, who as user devices has a telephone G21 for the telephony service, a computer G22 for the internal cable television network and a television set G23 for the external cable television network. The user L1 has a telephone L21, a computer L22 for Internet and the internal cable television network, a television set L23 for the external cable television network and a alarm device L24 connected to the network D11. The description below describes how the users are connected to the service networks and how they can change their use of these.

Figure 2:
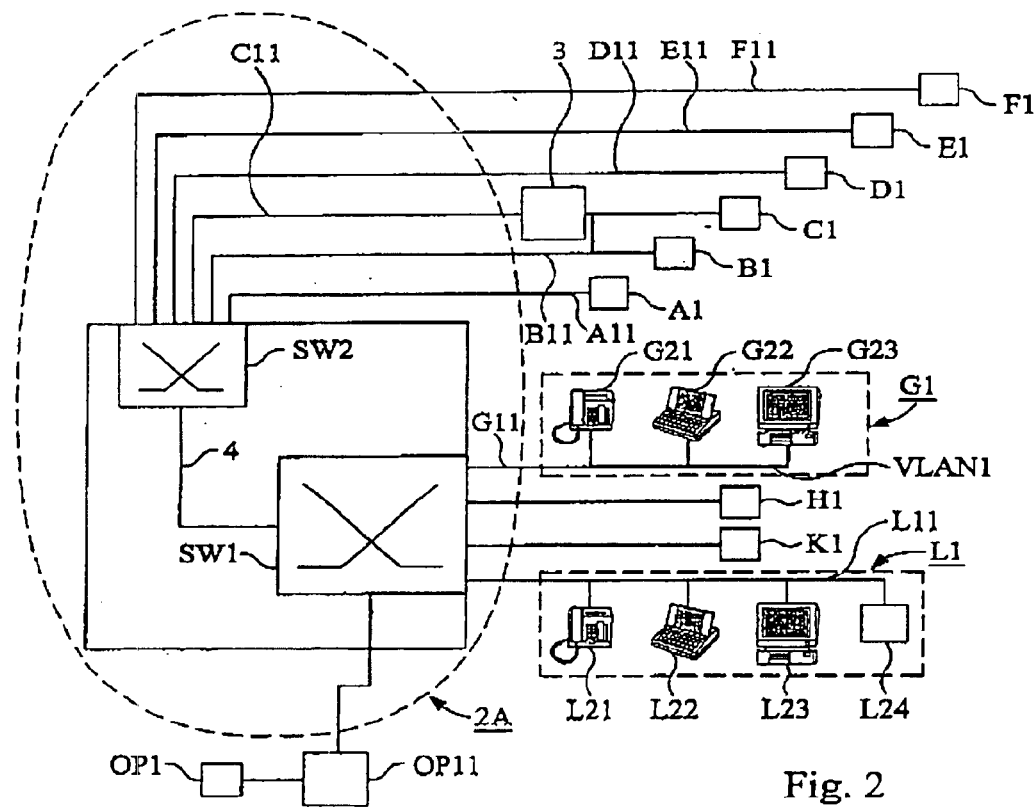
FIG. 2 shows in more detail the block diagram of the network.

In FIG. 2 the network in FIG. 1 is shown in more detail. The distribution network comprises a switched domain 2A with Ethernet switches SW1 and SW2, which are connected to each other through a connection 4. The different service networks in FIG. 1 are connected to the switches. Internet C11 is via a router, according to the example an IP path selector 3, connected to the switch SW2 and a service provider C1 on Internet is shown. A service provider A1 for telephony, a cable television operator B1 and an alarm operator D1 are connected to the switch SW2 via their respective service networks A11, B11 and D11. An internal service provider E1, providing internal supervision and an internal cable television operator F1 are connected to the switch SW2 via the internal service networks E11 and F11, respectively. The users G1, H1, K1 and L1 are connected to the switch SW1 via their respective connection G11, H11, K11 and L11. The devices of the user G1, the telephone G21, the computer G2-2 and the television set G23 are connected to the connection G11. In the same way the devices of the user L1, the telephone L21, the computer L22, the television set L23 and the alarm device L24 are connected to the connection L11. The users G1, H1, K1 and L11 ends only have one connection point each for the connection of their connection to the switch. A network operator OP1 has a terminal OP11, which is connected to the switches. The operator can reset the switches via his terminal.

The different services on the service networks are chosen and merged into groups, service networks groups, to which the users in the housing community 1 can connect. This selection of services into service network groups is for example made by a network operator and two such service network groups T1 and T2 are shown in FIG. 3. The first service network group comprises the services which the user G1 uses: the telephony service, external cable television and internal cable television which are present on the respective service network A11, B11 and F11. The other service network group T2 comprises the services which the user L1 uses: the telephony service, external cable television, Internet, the alarm service and internal cable television which are present on the respective service networks A11, B11, C11, D11 and F11. The different services can be merged into a number of other service network groups by the network operator, which however is not shown in FIG. 3.

An essential part of the present invention is that the different service network groups are distributed on different virtual broadcast domains, which in the examples are virtual local networks. In conjunction with the FIGS. 4, 5, 6, 7, 8 and 9 it will be described how the users are connected to and can change between these local networks in order to receive the desired number of the total offered services.

Regardless the type of telecommunication, for example data or telephony, the communication is divided into a layered structure as is shown in FIG. 4. Each layer has its specific task towards overlying and underlying layers and together the layers form a stack. Within Internet technique the so-called TCP/IP stack 10 is used. This communication model, which is shown in the figure, consists of 5 layers 11–15:

Layer 11, Application: Is defined by a user process, which communicates with another process. This other process can for example be e-mail via the protocol SMTP or "surfing" via the protocol HTTP.

Layer 12, Transport; Is defined by that control of transmission of data between end stations can be added. Transmission control protocol (TCP) offers a secure transmission of data between the user processes, whereas user datagram protocol (UDP) does not offer a secure transmission. Furthermore, in this layer the term "port" is defined, it is not to be confused with the port belonging to a switch. The term "port" here has the task of making it possible to distinguish processes in the same machine which uses the same transport protocol.

Layer 13, Internet: Internet protocol (IP) defines this layer. It is on this level one can offer different paths through so-called IP-path selectors (routers). The IP protocol, IP addressing and the IP path selector with its associated path selecting protocol provides the scalability present in today's Internet. The IP protocol does not offer a secure transmission. This is transferred to overlying protocols, which can be TCP, or if one uses UDP, application protocol.

Layer 14, Link: This layer defines the connection to the physical medium over which data is to be transmitted. The layer can, but does not have to, provide secure transmission. Furthermore the layer can be packet or stream oriented; IP does not put any requirements regarding this. Typical link techniques are Ethernet, ATM, Frame Relay etc.

Layer 15, Physical: This layer describes the physical media, which can be optical fibre, copper, the ether etc.

FIG. 5 shows the encapsulation method for data in the different layers. Application data 16 is delivered from the application layer 11 to the transport layer 12, adding a header 17 to data. The header 17 and data 16 is transmitted in a similar manner to the internet layer 13, again a header 18 is added. Finally data is transmitted to the link layer 14 and the same process, addition of a header 19 to data, is performed. In the link layer application data 16 and header 17 and 18 are now regarded as data. Data is now completely encapsulated and can be transported between transmitter and receiver over the physical layer 15.

The completely encapsulated data 16, 17, 18, 19 reaches, via the physical layer 15, its final destination at the receiver. Here, the stack 10 is traversed upwards, and headers 19, 18 and 17 are in turn removed at the respective layer. The header 19, having the label Ram Header in the figure, comprises 12 bits, by means of which the data sequence in a known manner can be directed towards the desired virtual local network. In the other headers there is information regarding error control, multiplexing etc.

Figure 6:
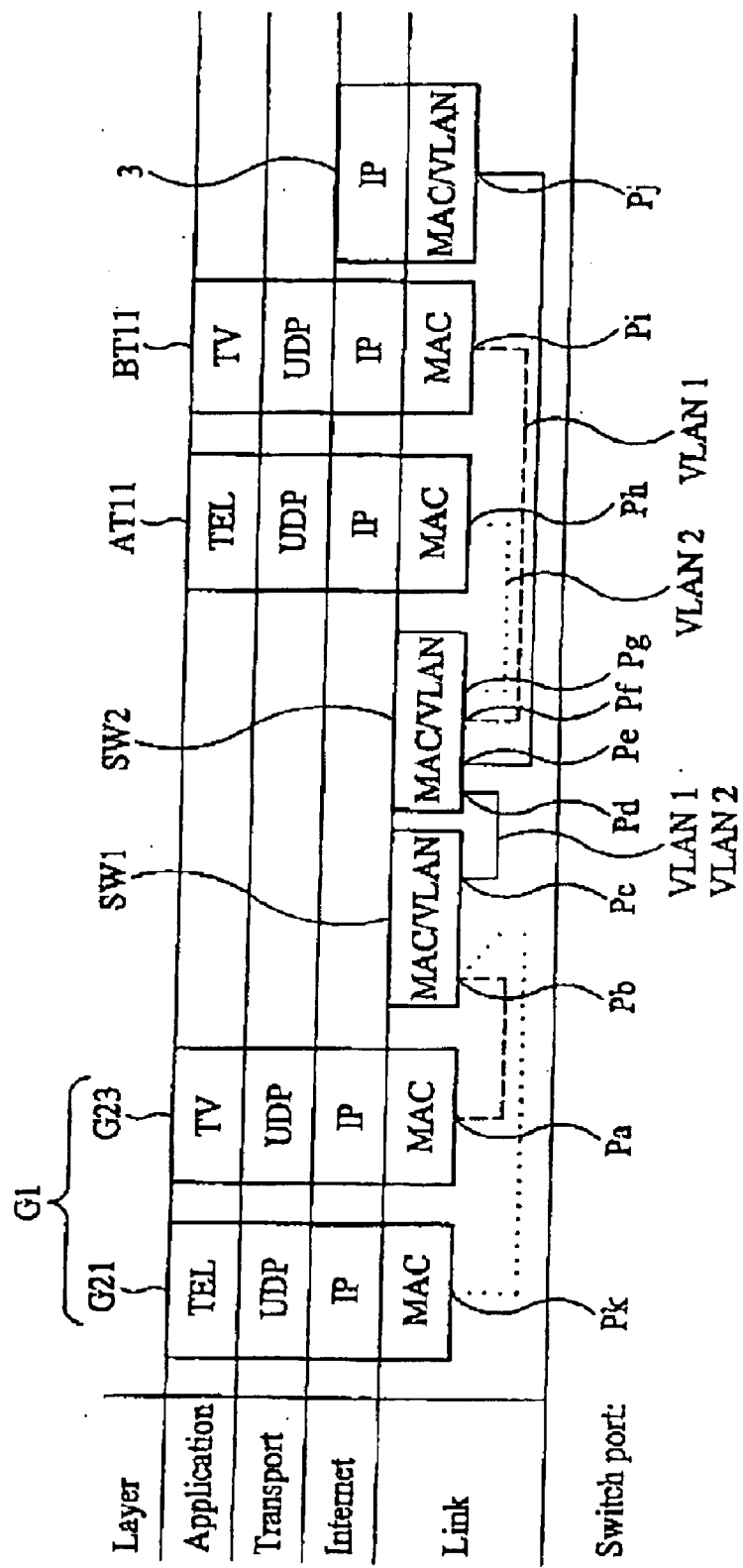
FIG. 6 shows a diagram of different devices in the network with their connections.

In FIG. 6 the connection of a user to a particular virtual network is shown in more detail. As an example the user G1 in FIG. 2 has been chosen and in order not to overload FIG. 6 only the services telephony and cable television have been chosen as an example. This means that the telephone network A11 is to be connected to the telephone G21 and that the cable television network B11 is to be connected to the television set G23 at the user G1. Hence, the telephony network in the example is regarded as a service network group AT11 having only one service and the cable television network B11 is regarded as a service network group BT11.

In FIG. 6 it is schematically shown how the application layer 11, the transport layer 12, the Internet layer 13 and the link layer 14 are common for the different parts in the communication system according to FIG. 2. The Figure shows ports Pa, Pb . . . Pk via which the parts are connected. The user G1 has, as described, a telephone G21 and a television set G23, which can be addressed on the different layers 1114, i.e. the layers link (MAC), Internet (IP), transport (via UDP and an associated port) and application. The two service network groups AT11 and BT11 are in same way as the user devices possible to address via the different layers. One service network group AT11 comprises, as described, only telephony and the other service network group BT11 only comprises cable television. The end user G1 initially receives the other service network group BT11 for cable television.

Between the end user G1 and the service network groups AT1 and BT11 there is the switched domain having the switches SW1 and SW2, which complies with a VLAN standard. Furthermore, there is the IP path selector 3, which enables the transport of traffic between different virtual local networks. The IP path selector can for example be connected via one or several switch ports and in the example comprises the switch port Pj, which is connected to the switch port Pe on the switch SW2. In the case-when the IP path selector is connected to the switched domain via several ports, it is not required that the link layer 14 in the IP path selector meets a VLAN standard.

The service network group BT11 on the service network B11 belongs to a virtual local network VLAN1, which is shown with dashed lines and which is defined by the switched ports Pb and Pf. In a corresponding manner the service network group AT11 belongs to a virtual local network VLAN2, which is shown with dotted lines and defined by the switch port Pg.

The continuous lines describes coupling between the switched ports Pc, Pd and Pe and Pj, respectively, which are able to resolve VLAN labelling of link level packets, i.e. that data associated with both the service network groups telephony and cable television can be transmitted on these lines. The television set G23 of the end user G1 is thus connected through the local virtual network VLAN1, which carries the service network group BT11 with the cable television service. The television set G23 is connected to the switch SW1 via the port Pb.

The network operator OP1 of the switched domain 2A manages the system according to the following in order to provide the user G1 with the desired service.

The network operator determines which service network groups that will be a part of the switched domain, according to the example the service network groups AT11 and BT11. These service network groups can be connected in two different ways. One way is via ports on the link level 14, which is the case for the service network groups AT11 and BT11 in the example above. Another way is via a port connected on Internet layer 13, for example via the IP path selector 3.

Furthermore, the network operator can create new virtual local networks, which have the task to offer accessibility via the IP path selector to permutations of virtual local networks and service network groups already defined.

Finally, the network operator OP1 can connect the user to the virtual local network VLAN1, which corresponds to the desire of the user. This is performed by means configuring the closest switch Pb, connected to the user device G23 of the user G1 to said virtual local network VLAN1.

The user can act in the following ways in different situations.

In a certain situation the user, for example the user G1, may wish to change service network group from BT11 having cable television to AT11 having telephony. The way in which the user G1 informs the link layer 14 in the switched domain of the desired change is not essential. The user can perform this either by giving notice to the network operator OP1 of the domain or perform the change himself via an existing interface in the device of the user.

Two reconfigurations of the communications system according to FIG. 6 is required in order for the user to receive the service network group AT11 having telephony instead of the service network group BT11 having cable television. The reconfigurations can be performed manually or dynamically. Firstly, the switch port Pd is to be configured so that it is disconnected from the virtual local network VLAN1 and connected to the virtual local network VLAN2. Secondly, the Internet layer, layer 13, of the user G1 is to be reconfigured so that it belongs to the virtual local network VLAN2, and receives parameters, for example IP address, so that connectivity is supported.

In another situation the user can have the service network group BT11 with cable television and also wishes to receive the service network group AT11 without disconnecting the access to the service network group BT11. This can be implemented in three different ways.

Firstly, the IP path selector 3 can be configured so that the IP address user G1 has and which belongs to the virtual local network VLAN1, is offered the possibility to reach the IP address which the service network group AT11 has. This requires no reconfiguration of the switch port Pb.

Secondly, the equipment providing the link layer, layer 14, at the user G1 can offer the option to act for the virtual local network. In this case, the port Pb can be configured so that it besides belonging to the virtual local network VLAN1 also belongs to the virtual local network VLAN2. In the same way, the port Pa at the user G1 will then belong to the two virtual local networks VLAN1 and VLAN2.

Thirdly, a common virtual local network, which is termed VLAN1+2, can be defined in the switched domain. Furthermore, the switch port Pb is main part of this virtual local network. The IP path selector 3 is then configured so that users connected to the network VLAN1+2 access the service network groups AT11 and BT11. This third way offers the option to, from a number of services, be able to select permutations of these, and deliver the permutations via different local networks.

In the description above, the invention has been implemented using Ethernet technique and the exemplary embodiment in FIG. 2 shows closest point-to-point communication. In addition, Ethernet technique allow a network topology both in star configuration and ring configuration. In conjunction with FIG. 7 an embodiment using ring technique will be described.

The Figure shows a ring network 20 having four switches SW3, SW4, SW5 and SW6. The switches are connected to each other via lines 21. The switch SW3 is connected to two service providers M1 and N1 having a service network each, and a user S1 having user devices. The switch SW4 is connected to a user T1, the switch SW5 is connected to a service provider 01 and a user P1 and the switch SW6 is finally connected to two users Q1 and R1. The network operator OP2 is connected to all switches via the switch SW4 and the lines 21 using a terminal OP21. A router 22 is also connected to the switch Sw4.

The network operator chooses among the service providers M1, N1 and O1 service networks and puts together service network groups. By means of configuring ports at the switches SW3 and SW5 the selected service network groups are placed on their respective virtual local network in the corresponding way which is described in conjunction with FIG. 6. The users P1, Q1, R1, S1 and T1 choose service network group and their respective switch is configured in order to receive the chosen service network group on the corresponding virtual local network.

Figure 7:
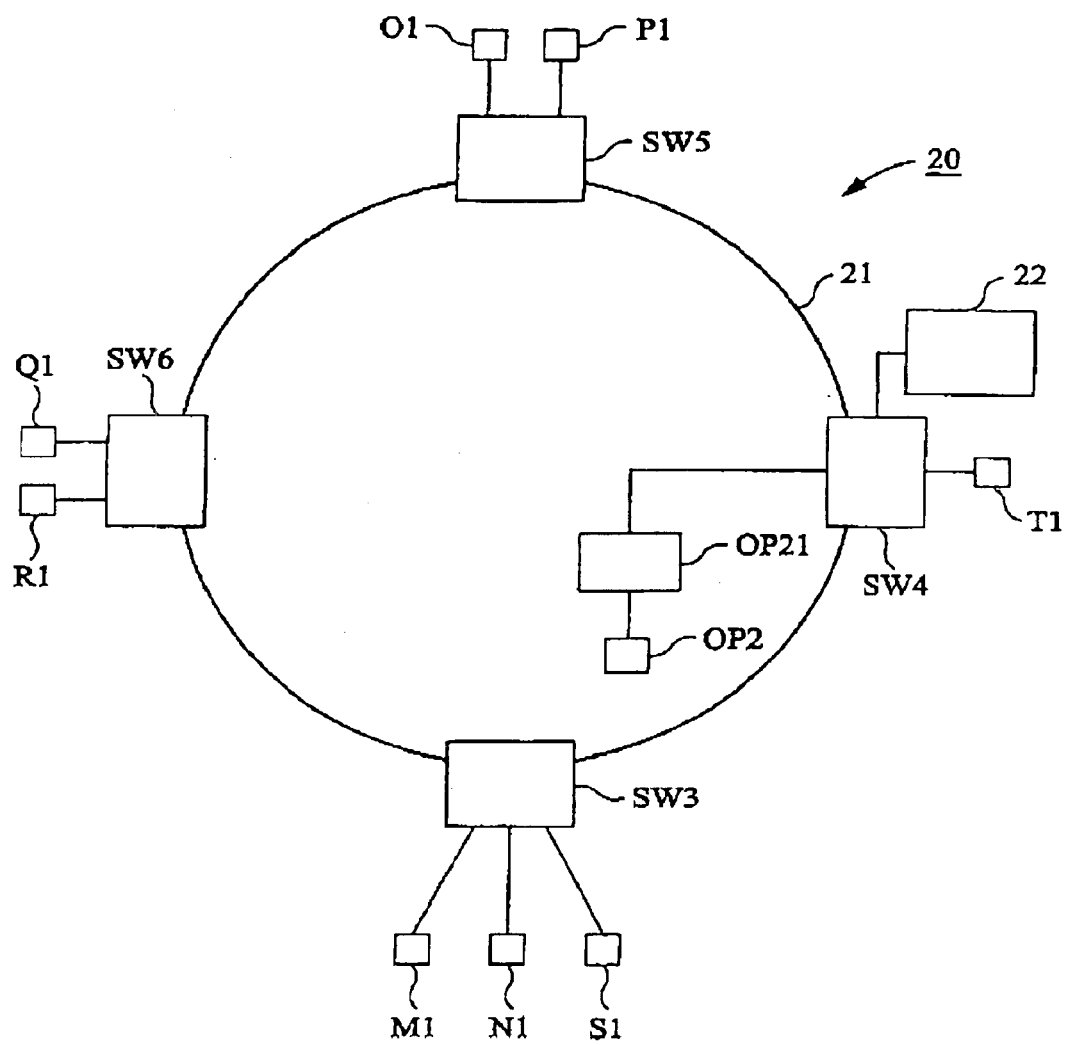
FIG. 7 shows a block diagram of a ring configured network.
Figure 8:
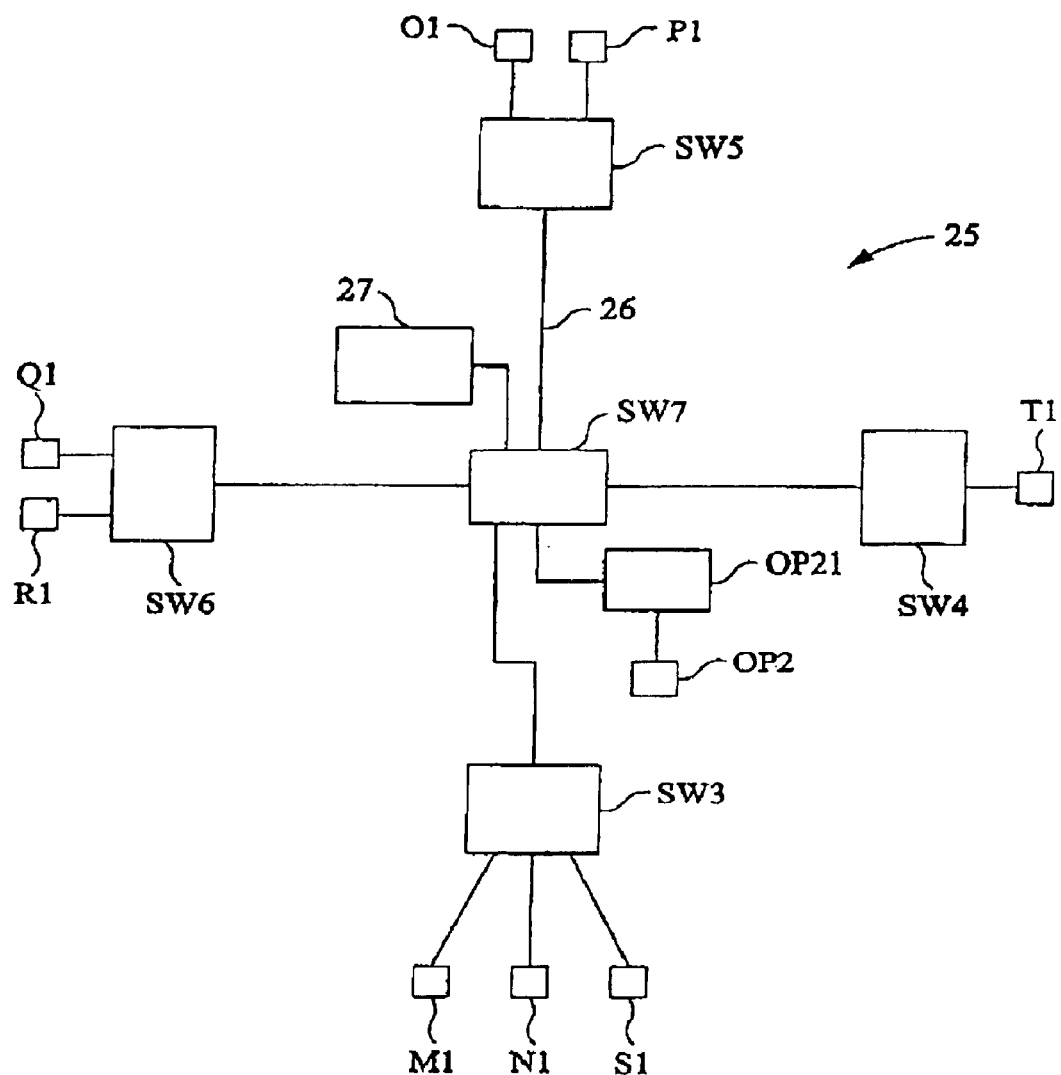
FIG. 8 shows a block diagram of a star configured network.

In FIG. 8, a star configured network 25 corresponding to the ring network 20 in FIG. 7 is shown. The star network has the four switches SW3, SW4, SW5 and Sw6 with the same users and service providers as in the ring network 20. Said four switches are connected in a star topology with a common switch SW7 via lines 26. The network operator OP2 having the terminal OP21 is connected to the switch SW7 and to which a router 27 also is connected. Also in this network the operator selects service network groups and puts them on virtual local networks. These networks are configured by means of the network operator OP1 configuring ports at all switches SW3, SW4, SW5, SW6 and SW7.

Figure 9:
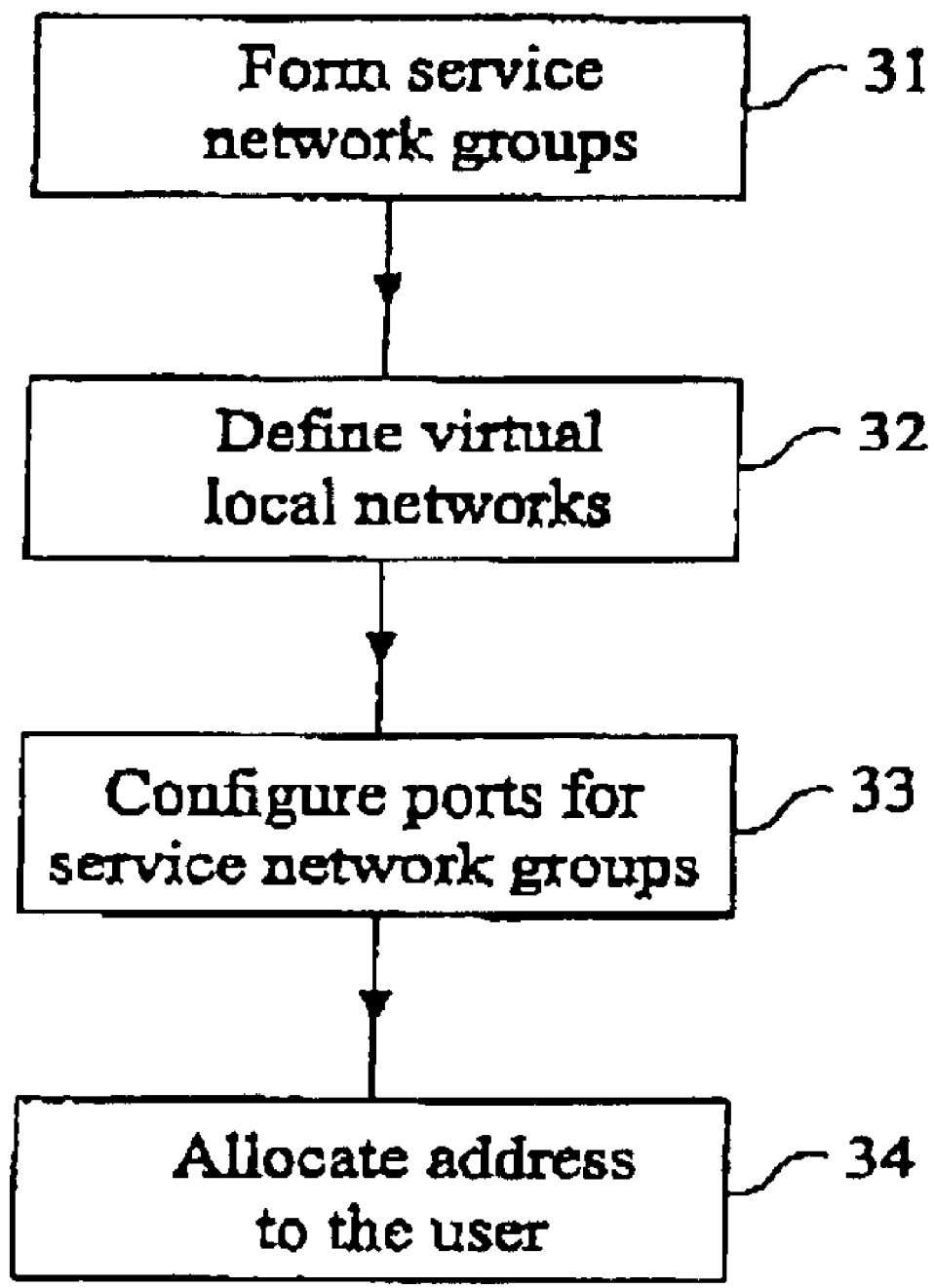
FIG. 9 shows a flow charge of a method according to the invention.

The method of connecting the users in the communication network to certain of the services as disclosed in the description above, will be described in connection to FIG. 9. The method assumes that the communication system is designed as shown in for example FIG. 2, FIG. 7 or FIG. 8. The system comprises the switched domain 2A and the service networks are connected to the switches in the domain. These also have ports for the user devices and the network operator has his terminal in order to configure the ports in the switches. In a first step 31 the service networks are selected and placed in service network groups. The virtual local networks are defined in step 32 and in step 33 the ports where the service network groups are accessible are configured to belong to the respective virtual local network. In step 34 the user is given an address corresponding to the selected virtual local network. When changing service network group the steps 33 and 34 are repeated.

In the above described exemplary embodiments the technique of virtual local networks has been used. However, initially it was described that the invention can be applied in virtual broadcast domains, which comprise the term virtual local networks. An example how virtual broadcast domain can be implemented is given below.

Over ATM (link level) the standard LANE emulation, LANE defined by ATM Forum is used. LANE also has the function to create logical broadcast domains over a link level structure. This is possible despite that ATM, as opposed to for example. Ethernet and the technique Token Ring, is a switched technique and not a broadcast technique.

Furthermore, the exemplary embodiments describe how the invention can be applied in the link technique Ethernet. Instead of Ethernet technique it is possible to use other link level techniques, for example Token Ring and FDDI.

The Internet protocol IP has been used through out the exemplary embodiments. However, it is possible to use other level three protocols, for example the protocols IPX, NetBEUI or Apple Talk.

What is claimed is:

1. A device in a switched telecommunication system comprising:
   a switched domain comprising at least one switch;
   at least two service networks connected to the switched domain;
   ports for user devices in said at least one switch in the switched domain;
   a router, which is connected to the switched domain for configuration of virtual broadcast domains wherein that the virtual broadcast domains are virtual local networks,
   at least two service network groups wherein
   each service network group being a selection among the service networks and ports for the service networks in a predetermined one of the service network groups being configured to belong to at least one of the virtual broadcast domains; and
   means for configuring the ports for the user devices of at least a predetermined one of the virtual broadcast domains.

2. A device according to claim 1, wherein said router connects at least one of the service networks to the switched domain.

3. A device according to claim 1, further comprises means arranged to reconfigure the ports for the user devices from the predetermined virtual broadcast domain to an alternative one of the broadcast domains.

4. A device according to claim 1, wherein that the communication system is based on the Internet protocol and that the router is an IP path selector.

5. A device according to claim 1, wherein that the communication system comprises a distribution network being a ring network.

6. A device according to claim 1, wherein that the communication system comprises a distribution network being a star network.

7. A method for maintaining a virtual local network in a switched telecommunication system including a switched domain having at least one switch, wherein said switch comprises ports for connecting with user devices, comprising the steps of:
   connecting at least two service networks to the switched domain:
   connecting a router to the switched domain; and
   configuring virtual broadcast domains using the router, wherein said step of configuring further comprises the steps of:
   forming service network groups from a selection among the service networks;
   allocating a predetermined one of the service network groups to at least one of the virtual broadcast domains and configuring the corresponding port; and
   configuring the port for the user devices to a selected one of the virtual broadcast domains.

8. A method according to claim 7, further comprises the step of connecting at least one of the service networks to the virtual broadcast domain via the router.

9. A method according to claim 7, said step of reconfiguration of the port for the user devices from the selected virtual broadcast domain to an alternative one of the virtual broadcast domains.

10. A method according to claim 7, wherein that an additional one of the virtual broadcast domains is connected to the port for the user devices by means of reconfiguration of this port.

11. A method according to claim 7, wherein that an additional one of the virtual broadcast domains is made accessible via the port for the user devices by means of reconfiguring the router.

12. A method according to claim 7, wherein that an additional one of the virtual broadcast domains is connected to the port for the user devices using the following steps:
    configuring a common virtual broadcast domain;
    connecting the port for the user devices to said common broadcast domain; and
    reconfiguring the router so that said common broadcast domain accesses the original broadcast domain and also said additional broadcast domain.

13. A method according to claim 7, wherein that the virtual broadcast domains are virtual local networks.

14. A method according to claim 7, wherein that the communication system is based on the Internet protocol (IP) and that the router is an IP path selector.

* * * * *

UNITED STATES PATENT AND TRADEMARK OFFICE
CERTIFICATE OF CORRECTION

PATENT NO. : 6,873,624 B1
APPLICATION NO. : 09/572691
DATED : March 29, 2005
INVENTOR(S) : Johansson et al.

It is certified that error appears in the above-identified patent and that said Letters Patent is hereby corrected as shown below:

On the Face Page, Filed (57), under "ABSTRACT", Column 2, Line 5, delete "fines" and insert -- lines --, therefor.

In Column 1, Line 63, delete "802.1D" and insert -- 802.1p --, therefor.

In Column 10, Line 2, in Claim 7, delete ":" and insert -- ; --, therefor.

Signed and Sealed this

Eighth Day of April, 2008

JON W. DUDAS
*Director of the United States Patent and Trademark Office*